Figure 1:
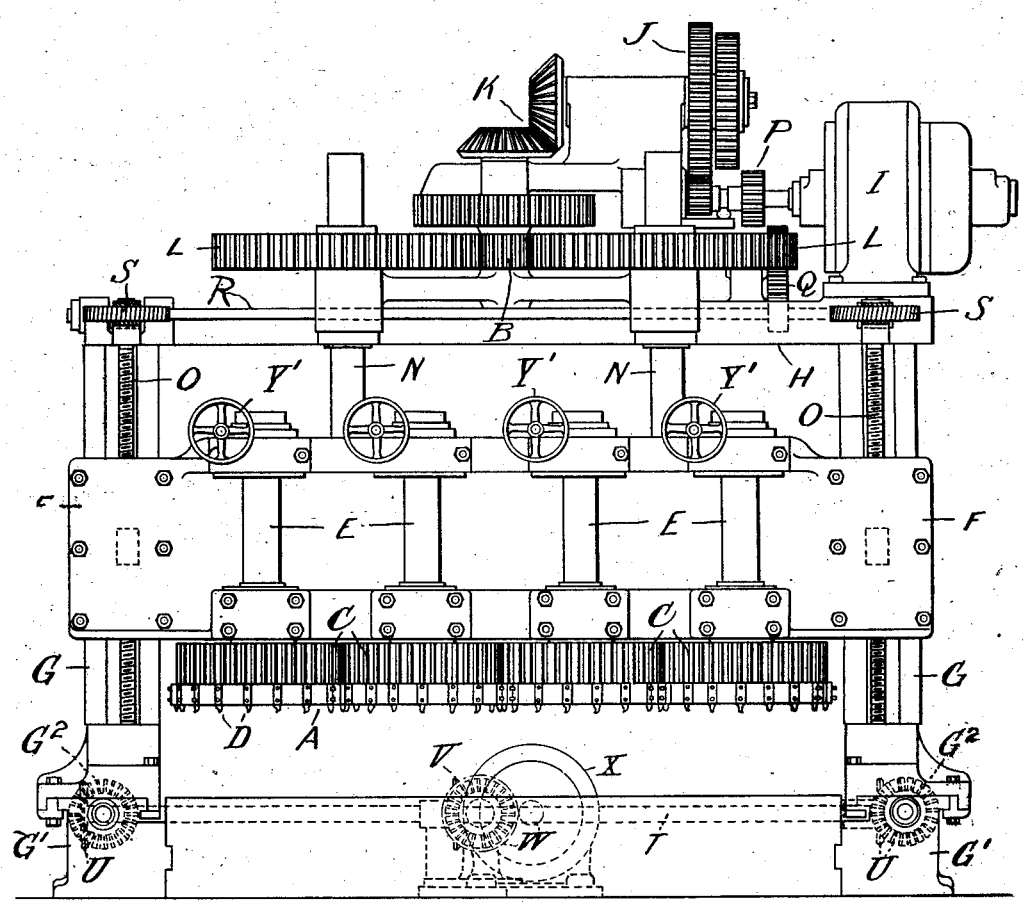

C. F. SHANKS.
MILLING MACHINE.
APPLICATION FILED NOV. 18, 1911.
1,021,430.
Patented Mar. 26, 1912.
2 SHEETS—SHEET 2.
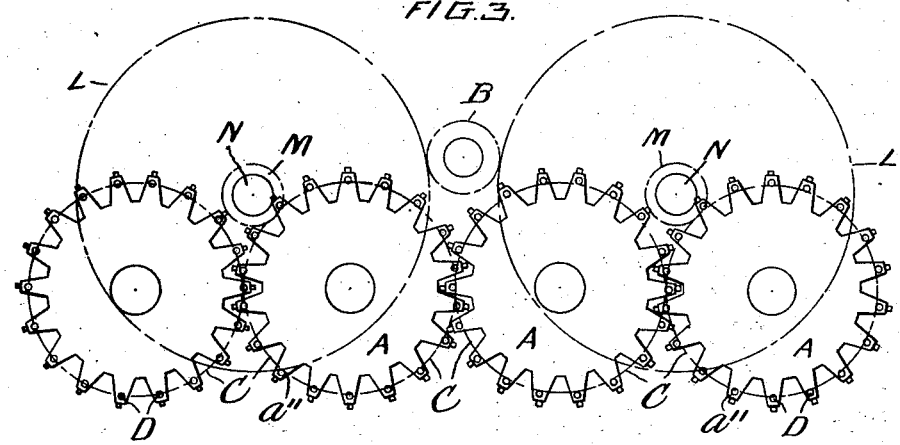
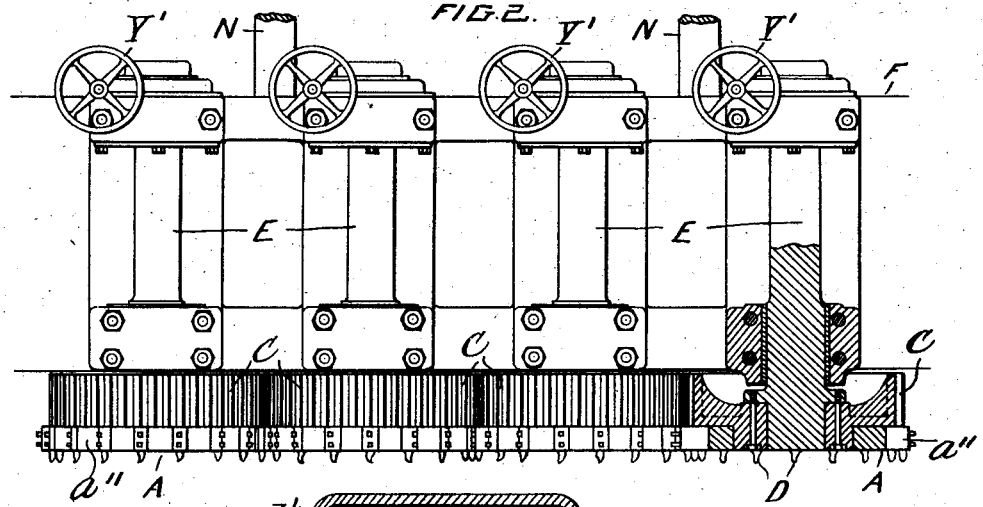
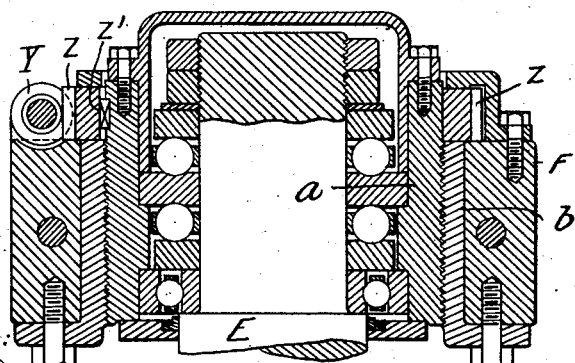
WITNESSES:
INVENTOR
Charles Frederick Shanks
BY
Attorneys

UNITED STATES PATENT OFFICE.

CHARLES FREDERICK SHANKS, OF JOHNSTONE, SCOTLAND.

MILLING-MACHINE.

1,021,430. Specification of Letters Patent. Patented Mar. 26, 1912.

Application filed November 18, 1911. Serial No. 661,091.

*To all whom it may concern:*

Be it known that I, CHARLES FREDERICK SHANKS, a subject of the King of the United Kingdom of Great Britain and Ireland, and residing at Johnstone, Renfrewshire, Scotland, have invented a certain new and useful Improvement in Milling-Machines, of which the following is a specification.

This invention relates to machines for milling surfaces, e. g., the surfaces of armor plates.

The problem of milling broad surfaces by means of a plurality of milling cutter wheels arranged in a line perpendicular to the direction of travel is coupled with a difficulty which arises from the fact that a ridge is necessarily left representing the distances between the peripheries of the cutter wheels—which distance cannot be decreased beyond the limits permitted by the use of engaging gear wheels for driving the cutters simultaneously. The use of staggered rows of cutter wheels would also be objectionable for the reason that during part of the milling operation the milling cutters would be only partly operative.

According to the present invention, the difficulties and objections above mentioned are overcome by arranging a plurality of cutter wheels in a line or lines substantially or presumably at right angles to the direction of travel, while provision is made for treating the entire surface to be milled, including the part which would otherwise be left as a ridge.

In the accompanying drawings Figure 1 is an elevation of a milling machine equipped with the improved arrangement of cutter wheels: Fig. 2 is a part elevation part vertical section showing the cutter wheels and relative parts detached from the machine: Fig. 3 is a plan of the cutter wheels and gearing therefor: Fig. 4 shows on an enlarged scale a detail hereinafter referred to.

Referring to the drawings, the cutter wheels A are driven from a common spur pinion B or the like, each cutter wheel being coaxial with a spur wheel C, and all the engaging spur wheels C lying in the instance shown in a line at right angles to the direction of travel. The cutter wheels A are formed, as shown particularly in Fig. 3, with tooth-like projections $a^{11}$ made to clear each other, and projecting from the teeth in a direction substantially perpendicular to the plane of the wheels A are preferably detachable cutters D so disposed that the path in which the cutters of one wheel A operate overlaps the path in which the cutters of an adjacent wheel A operate, said cutters D thus serving to surface that part which would otherwise be left as a narrow ridge as aforesaid.

As shown, the spur wheels C and cutter wheels A are secured to shafts E supported at their upper ends by ball bearings in a frame member F disposed transversely of, and adjustably vertically in relation to a framework which includes end standards G and is adapted to be moved in a horizontal plane relatively to stationary members $G^1$ serving as a base. An electric motor I is supported at the upper end H of said framework, which motor is adapted, through spur gearing J and bevel gearing K carried by said framework, to drive the spur pinion B, which pinion B communicates motion to the spur wheels C through spur wheels L and M on shafts N supported between the standards G, the spur wheels M being slidable relatively to said shafts N so as to permit of vertical adjustment of the frame member F as by means of screw-threaded spindles O rotatably mounted on the standards G and operated from the electric motor I through a sliding pinion P which imparts movement to spur gearing Q for driving a shaft R connected to the said spindles O by means of worm gearing S. The standards G are movable relatively to the stationary base members $G^1$ by means of screw-threaded spindles $G^2$ mounted on said members and adapted to be rotated from a shaft T by means of bevel gearing U, which shaft T is driven by means of bevel gearing V and spur gearing W from an electric motor X.

As shown particularly in Fig. 4, means are provided to permit of axial adjustment of each of the cutter wheels A, said means comprising, for example, a worm Y, operable by a hand wheel $Y^1$, Fig. 1, and worm wheel Z rotatably mounted on the frame member F, said worm wheel Z being adapted to rotate a sleeve $a$ freely surrounding the shaft E—but immovable axially thereof—and in screw-threaded engagement with a fixed bush $b$, said sleeve having also a feather-and-groove connection at $Z^1$ with the worm wheel Z, so that when the wheel Z is rotated the sleeve *a* is also rotated and moved axially relatively to the bush *b*, thereby moving axially the shaft E.

Having now described my invention what I claim and desire to secure by Letters Patent of the United States is:—

1. A milling machine comprising, in combination, a framework adapted to be moved in a horizontal plane, and a plurality of rotatable members carried on vertical axes, a vertically adjustable frame member supporting said rotatable members, and which rotatable members include cutting devices so disposed that the path in which the cutting devices of one rotatable member operate overlaps the path in which the cutting devices of an adjacent rotatable member operate.

2. A milling machine comprising, in combination, a framework adapted to be moved in a horizontal plane, said framework including end standards, a frame member extending transversely of said standards, means for adjusting said frame member vertically relatively to said standards, and a plurality of rotatable members carried on vertical axes mounted on said frame member, said rotatable members including cutting devices so disposed that the path in which the cutting devices of one rotatable member operate overlaps the path in which the cutting devices of an adjacent rotatable member operate.

3. A milling machine comprising, in combination, a framework adapted to be moved in a horizontal plane, said framework including end standards, a frame member extending transversely of said standards, means for adjusting said frame member vertically relatively to said standards, a plurality of rotatable members carried on vertical axes mounted on said frame member, said rotatable members including cutting devices so disposed that the path in which the cutting devices of the rotatable member operate overlaps the path in which the cutting devices of an adjacent rotatable member operate, and means for adjusting said rotating members axially relative to said frame member.

4. A milling machine comprising in combination, a framework adapted to be moved in a horizontal plane, said framework including end standards, a frame member extending transversely of said standards, means for adjusting said frame member vertically relatively to said standards, a plurality of cutter wheels rotatable on vertical axes each wheel having tooth-like projections on its periphery, and cutting devices carried on said projections and so disposed that the path of movement of the cutting devices on one wheel overlaps the path of movement of the cutting devices on an adjacent wheel.

In testimony whereof I have signed my name to this specification in the presence of two subscribing witnesses.

CHARLES FREDERICK SHANKS.

Witnesses:
WALLACE CRANSTON FAIRWEATHER,
JOHN TRAIEL STEVENSON.

Copies of this patent may be obtained for five cents each, by addressing the "Commissioner of Patents, Washington, D. C."